Figure 1:
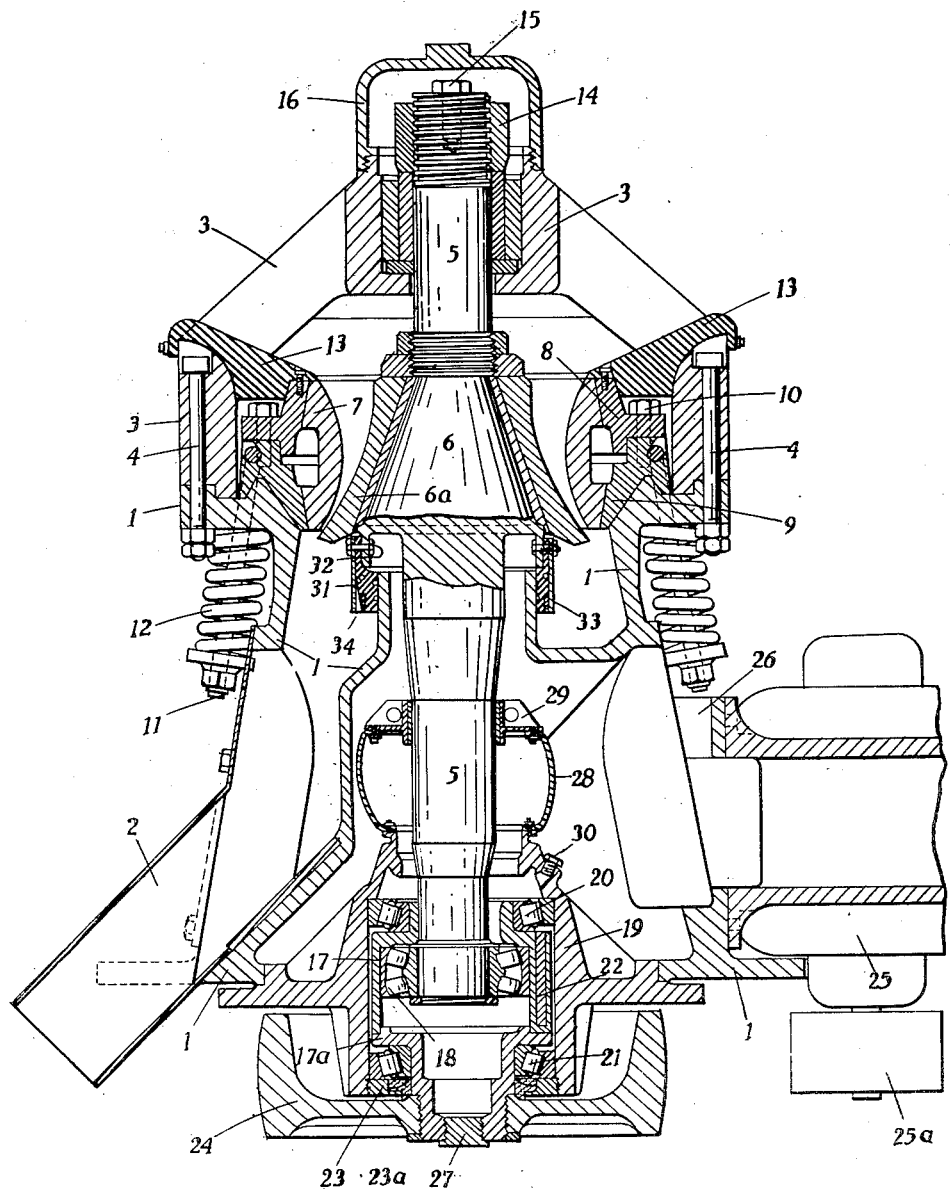

Patented Aug. 24, 1943

2,327,384

UNITED STATES PATENT OFFICE 2,327,384

GYRATORY CRUSHER

Griffith Annesley, London, England

Application March 25, 1940, Serial No. 325,854
In Great Britain June 15, 1939

4 Claims. (Cl. 83—10)

This invention is concerned with gyratory crushers, as commonly employed for crushing rock or ore.

The invention relates to the type of gyratory crusher in which a vertical shaft mounted for gyratory movement carries a conical crushing mantle which gyrates in an annular member or 'concave', and in which the lower portion of the shaft is journalled in an eccentric rotatably mounted in a bearing bush and driven from a power source such as an electric motor associated with the crusher. Owing to the high load factor the eccentric and its bearing bush have hitherto usually been made of very considerable length in an attempt to obtain adequate bearing surface, yet in practice the bearing bush has had to be relined or renewed at frequent working intervals. Moreover, the long bearing necessary heretofore obviously adds to the overall size of the crusher. An object of the present invention is to lessen these and other disadvantages of the known gyratory crushers.

With this object in view the invention provides an improved, compact arrangement of the eccentric motion which is easy to manufacture, lubricate and maintain and which requires the minimum of power for its operation.

In accordance with the invention the eccentric is mounted by anti-friction bearings, e. g. tapered roller or ball bearings, in a bearing bush or housing whose internal diameter closely approximates the external diameter of the eccentric. For example, the eccentric has end portions reduced in diameter to accommodate upper and lower roller or ball bearings, only the outer races projecting very slightly beyond the outer cylindrical wall of the eccentric into snug engagement with the bush or housing.

In this way it becomes practically possible to employ adequate load capacity roller or ball bearings sufficiently small in size to warrant their installation in a gyratory crusher. With such bearings the length of the eccentric and the bearing bush or housing can safely be reduced with consequent saving in the overall height and therefore the cost of manufacturing the crusher. There is also a saving in the power cost of operation due to the reduced bearing friction and for the same reason longer working life without renewal, and since the starting torque is small a smaller driving motor can be employed.

Another feature of the invention consists in journalling the lower portion of the crusher shaft in the bore of the eccentric through the intermediary or anti-friction members. For instance, a double-row, self-aligning roller bearing carried by the shaft has its outer race a sliding fit in the eccentric bore. Alternatively, the self-aligning bearing is constituted by a bearing of the heavy needle or parallel roller type interposed between the crusher shaft and globular member which seats in a globular seating within the eccentric.

Another feature of the invention consists in arranging the aforesaid anti-friction bearing to run in a closed lubricant container formed by the bearing bush or housing, under elimination of extraneous lubricant circulating means.

A simple and effective mounting for the driving motor is obtained by incorporating in the main body of the crusher, a bracket or brackets so positioned that when the motor is mounted its driving pulley will align with the crusher pulley which is secured to the eccentric.

Fig. 1 of the accompanying drawings shows, in vertical section, one constructional form of gyratory crusher embodying the foregoing and other features of the invention.

Figure 2:
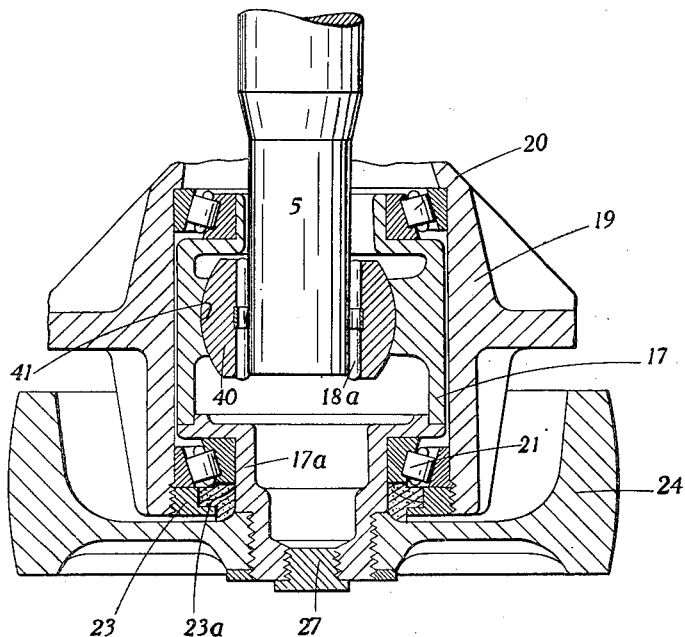

Fig. 2 is a sectional view of a modification.

Referring now to the drawings, 1 denotes the main body or casting of the crusher, 2 the discharge chute for the crushed material, 3 the upper spider member secured to the main body 1 by bolts 4, 5 the gyratory shaft, 6 the crushing head on the shaft, 6a the detachable crushing mantle on the head, and 7 the co-acting concave.

The concave 7 is held by a pair of ring members 8, 9 which are secured to one another by tap bolts 10, and the whole concave assembly is resiliently anchored to the main body 1 by means of T-headed bolts 11 and springs 12 in the manner clearly shown. 13 is a moulded flexible member protecting the seating rings 8, 9 of the concave assembly.

The upper screw-threaded end of the shaft 5 carries a nut 14 by which it is suspended in bearing bushes in the boss of the spider member 3, this nut being locked by a tapered set-screw 15 engaging the upper end of the shaft, which is split for a short distance. A cap nut 16 on the boss of the spider member encloses the described upper bearing assembly of the shaft.

The lower portion of the gyratory shaft 5 is journalled in the bore of a two-part eccentric 17, 17a through the intermediary of a double-row, self-aligning roller bearing 18 (Fig. 1). The eccentric is rotatable in a bush or housing 19 secured to the lower part of the main body 1, the internal diameter of the bush being only slightly in excess of the external diameter of the eccentric. However, the eccentric has portions reduced in diameter (stepped-down portions) accommodating upper and lower roller bearings 20, 21 of which only the outer races project slightly beyond the outer cylindrical wall of the eccentric into snug engagement with the bush 19. The thicker portion of the eccentric is made hollow, at 22, and if necessary charged with lead for balancing purposes.

The parts 17, 17a of the eccentric are held together and retained in the bush 19 by a ring nut 23 in screw-threaded engagement with the lower end of the bore of the bush, this nut having an integral lubricant seal 23a of the "Gits" type.

Examples of such integral lubricant seals are illustrated more fully in Letters Patent of the United States granted to Remi J. Gits, Nos. 1,925,729, granted September 5, 1933; 2,021,414, granted November 19, 1935; and 2,052,762, granted September 1, 1936, for Oil seals.

Further, the part 17a of the eccentric has a screw-threaded nave whereon is fixed a pulley 24 to be driven from an adjacently situated electric motor 25 (as by V-belts or the like not shown). A bracket 26 incorporated in the main body 1 serves for the mounting of the driving motor, this bracket being so disposed that when the motor 25 is secured thereon its driving pulley 25a aligns with the pulley 24.

It will be seen that the roller bearings 20, 21 and 18 run in a lubricant container formed by the bearing bush 19 in conjunction with the eccentric 17, 17a, whose part 17a is closed by a drain plug 27 whilst the upper end of the bush 19 is closed by a flexible dust-proof seal 28 attached to the bush and to a collar 29 on the gyratory shaft 5. 30 denotes a removable plug in a filling opening for lubricant formed in the bush 19.

A flexible dust-proof seal 31 is also provided between the under side of the crusher head 6 and the inner wall of the main body 1. This flexible seal 31 is secured to the head 6 by bolts 32 which also serve to hold a metal sleeve 33 for protecting the flexible seal. The latter is surrounded near its lower end, by a springy metal band 34 which draws it constantly into engagement with the inner wall of the main body 1 of the crusher.

In the operation of the crusher the pulley 24 is rotated from the electric motor 25. Consequently, the eccentric 17, 17a is rotated in the bearing bush 19 and so gyrates the shaft 5. The material to be crushed is charged into the crusher between the arms of the spider member 3 and is subjected to crushing action between the mantle 6a and the concave 7. The crushed material leaves the crusher by way of the discharge chute 2.

Should an uncrushable object or "tramp" iron be encountered, the whole concave assembly yields upwardly under compression of the anchoring springs 12. Manifestly, the initial compression of the anchoring springs is adjustable.

Since with this arrangement of resiliently yielding concave assembly, no provision has to be made for resilient axial movement of the gyratory shaft 5, the overall height of the crusher is reduced—likewise the length of the eccentric bearing. However, the most important point of the invention is the provision in the manner described of commercially practical anti-friction bearings for the eccentric and for journalling the shaft in the eccentric bore—and which leads to the advantages set out in the opening paragraphs of this specification. Of course, this important feature of the invention may be applied to crushers in which the upper end of the gyratory shaft is resiliently anchored in known manner for downward movement in the event of "tramp" iron being encountered.

According to the modification illustrated by Fig. 2, the self-aligning bearing journalling the lower end of the shaft 5 in the eccentric 17, 17a is constituted by a bearing 18a of the heavy needle or parallel roller type interposed between the shaft and a globular member 40 seated in a globular seating 41 within the eccentric. This arrangement permits of axial "float" of the gyratory shaft through the journal bearing.

I claim:

1. In a gyratory crusher, a crusher shaft eccentric, a housing for said eccentric having an inner diameter approximating the outer diameter of said eccentric; said eccentric comprising an upper main part reduced in diameter at its upper end, and a lower stepped part secured to the upper main part and reduced in diameter at its lower end; rolling contact anti-friction bearing means engaged with the upper and lower parts of said eccentric at the ends of reduced diameter and with said housing for mounting said eccentric in said housing, and self-aligning roller contact anti-friction bearing means mounted within said eccentric between the ends of reduced diameter for journalling the lower end of the crusher shaft; the upper end of said eccentric being open to accommodate the crusher shaft, the lower end of said eccentric being closed, and a ring nut having an integral lubricant seal for retaining said eccentric in said housing; said housing constituting a lubricant container for providing lubrication at all said bearing means.

2. A gyratory crusher having its crusher shaft journalled by means of a self-aligning, rolling-member bearing in the bore of the eccentric, and an eccentric mounted by anti-friction, rolling-member bearings in a housing; said housing being carried by the main structure of the crusher and containing an eccentric-receiving seating open at its lower end and of uniform diameter, only slightly greater than the external diameter of the eccentric, from said open lower end to an inward abutment at the upper end; the rolling-member bearings of the eccentric being accommodated in portions of reduced diameter at the ends of said eccentric and having their outer races projecting slightly beyond said eccentric so as to make snug engagement with the said cylindrical seating; the eccentric at its lower end having an extension forming an axle projecting beyond the housing and to which a pulley is secured; and the eccentric and bearings therefor being held in position by a retaining ring nut which is threaded into the open end of said seating to abut the outer race of the lower bearing and lubricant sealing means cooperating with said axle.

3. A gyratory crusher as claimed in claim 2, wherein the axle has a bore closed at its lower end by a removable plug, there being also an entry for introducing lubricant to the housing above the level of the eccentric, and a flexible seal between the upper end of said housing and the crusher shaft, said housing and eccentric together thereby forming a self-contained, drainable lubricant-receiver.

4. In a gyratory crusher, a crusher shaft eccentric, a housing for said eccentric having an inner diameter approximating the outer diameter of said eccentric; said eccentric comprising an upper main part reduced in diameter at its upper end, and a lower stepped part secured to the upper main part and reduced in diameter at its lower end; rolling contact anti-friction bearing means engaged with the upper and lower parts of said eccentric at the ends of reduced diameter and with said housing for mounting said eccentric in said housing, the lower end of said eccentric being closed and provided with a driving pulley, and a motor mounted in cooperative relation on said housing for driving said pulley.

GRIFFITH ANNESLEY.